(12) United States Patent
Brandstetter et al.

(10) Patent No.: US 12,403,814 B2
(45) Date of Patent: Sep. 2, 2025

(54) LIGHT MODULE FOR MOTOR VEHICLES

(71) Applicant: ZKW Group GmbH, Wieselburg (AT)

(72) Inventors: Martin Brandstetter, Ybbs (AT); Johann Altmann, Gmünd (AT); Matthaus Artmann, Ybbs an der Donau (AT); Peter Hartmann, Schönbühel-Aggsbach (AT); Stefan Weissensteiner, Waldenstein (AT)

(73) Assignee: ZKW Group GmbH, Wieselburg (AT)

( * ) Notice: Subject to any disclaimer, the term of this patent is extended or adjusted under 35 U.S.C. 154(b) by 832 days.

(21) Appl. No.: 17/763,749

(22) PCT Filed: Sep. 25, 2020

(86) PCT No.: PCT/EP2020/076902
§ 371 (c)(1),
(2) Date: Mar. 25, 2022

(87) PCT Pub. No.: WO2021/078469
PCT Pub. Date: Apr. 29, 2021

(65) Prior Publication Data
US 2022/0324372 A1     Oct. 13, 2022

(30) Foreign Application Priority Data

Oct. 23, 2019   (EP) .................................. 19204741

(51) Int. Cl.
*G01S 17/93*     (2020.01)
*B60Q 1/00*     (2006.01)
(Continued)

(52) U.S. Cl.
CPC .......... *B60Q 1/0023* (2013.01); *B60Q 1/076* (2013.01); *F21S 41/13* (2018.01); *F21S 41/16* (2018.01);
(Continued)

(58) Field of Classification Search
None
See application file for complete search history.

(56) References Cited

U.S. PATENT DOCUMENTS

| 2018/0029525 A1 | 2/2018 | Park et al. |
| 2019/0271769 A1 | 9/2019 | Raly et al. |
| 2021/0025561 A1 | 1/2021 | Orlinskiy |

FOREIGN PATENT DOCUMENTS

| CN | 207350122 U | 5/2018 |
| DE | 102016205506 A1 | 10/2017 |

(Continued)

OTHER PUBLICATIONS

International Search Report for PCT/EP2020/076902, dated Apr. 23, 2021 (14 pages).

(Continued)

*Primary Examiner* — Hovhannes Baghdasaryan
(74) *Attorney, Agent, or Firm* — Eversheds Sutherland (US) LLP

(57) ABSTRACT

A light module for motor vehicles, having a first laser arrangement ($L_S$), which contains at least one laser light source (L1, L2, L3, L4) which can be modulated, the laser beam(s) (b1, b2, b3, b4) of which is/are directed to a pivotable micromirror (6) controlled by a mirror control (8) and from there to a light-converting means (7), and having a lighting optics (9) for projecting the illumination pattern generated by the light-converting means (10) into the traffic space/roadway, as a lighting system, and having a second laser arrangement ($V_L$), which contains at least one laser light source (H1, H2, H3), the laser beam/laser beams (c1, c2, c3) of which is/are sent to the pivotable micromirror (6) controlled by the mirror control (8) and from there into the traffic space/roadway via a LIDAR exit optics (21), as well as having a LIDAR entry optics (14), which sends light of (Continued)

Figure 1:
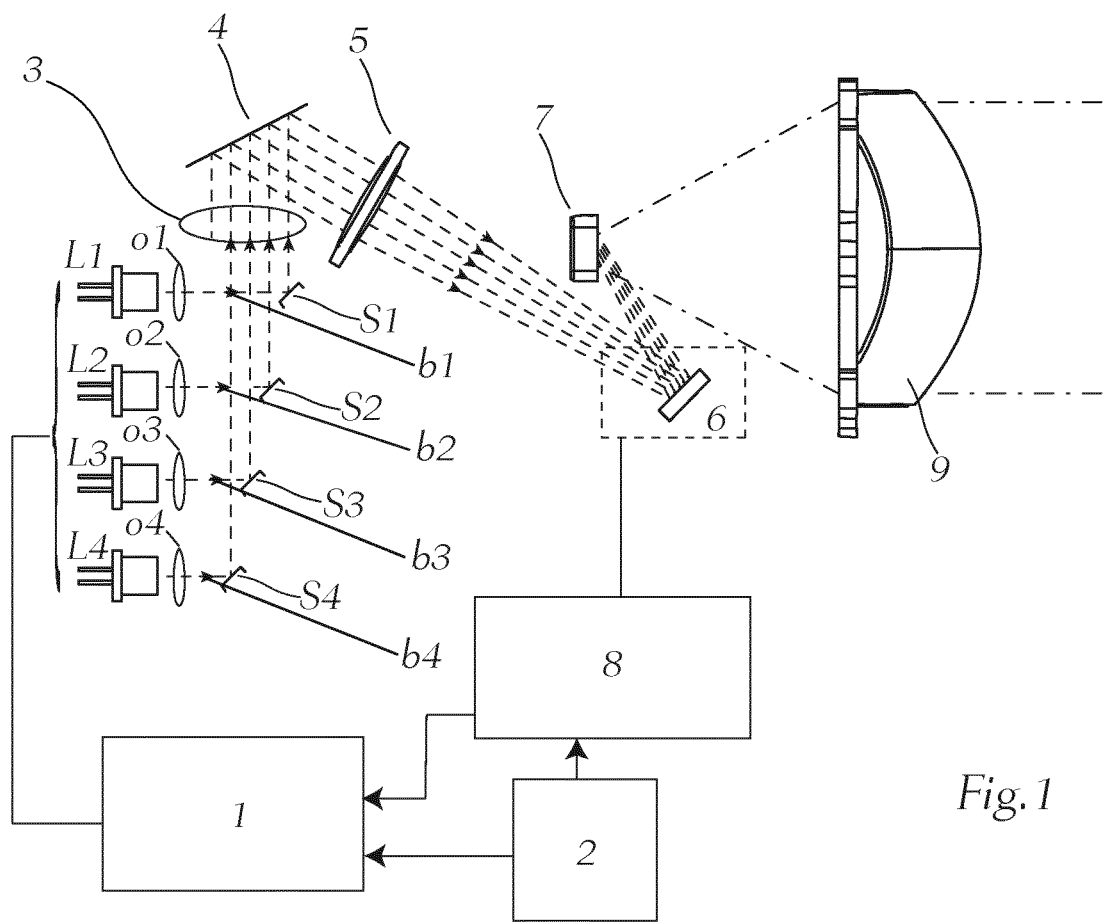

the second laser arrangement reflected in the exterior space to a detector (15), as a LIDAR system.

14 Claims, 3 Drawing Sheets

(51) Int. Cl.
| | |
|---|---|
| *B60Q 1/076* | (2006.01) |
| *F21S 41/13* | (2018.01) |
| *F21S 41/16* | (2018.01) |
| *F21S 41/675* | (2018.01) |
| *G01S 7/481* | (2006.01) |
| *G01S 17/931* | (2020.01) |
| *G01S 13/931* | (2020.01) |

(52) U.S. Cl.
CPC ............ *F21S 41/675* (2018.01); *G01S 7/4815* (2013.01); *G01S 7/4817* (2013.01); *G01S 17/931* (2020.01); *B60Q 2300/05* (2013.01); *G01S 2013/93277* (2020.01)

(56) References Cited

FOREIGN PATENT DOCUMENTS

| | | | |
|---|---|---|---|
| WO | 2017106892 | A1 | 6/2017 |
| WO | 2018176073 | A1 | 10/2018 |

OTHER PUBLICATIONS

Search Report for European Patent Application No. 19204741.3 dated Mar. 31, 2020 (27 pages).

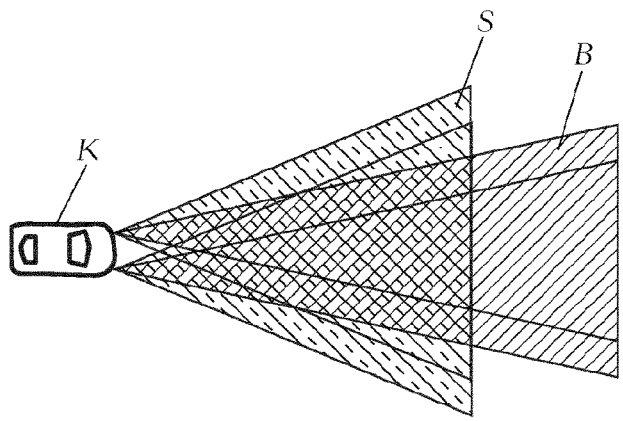
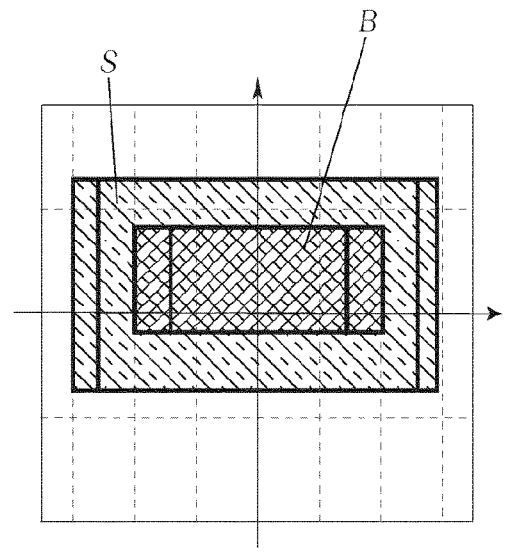
Fig. 5a　　　　　　　　Fig. 5b
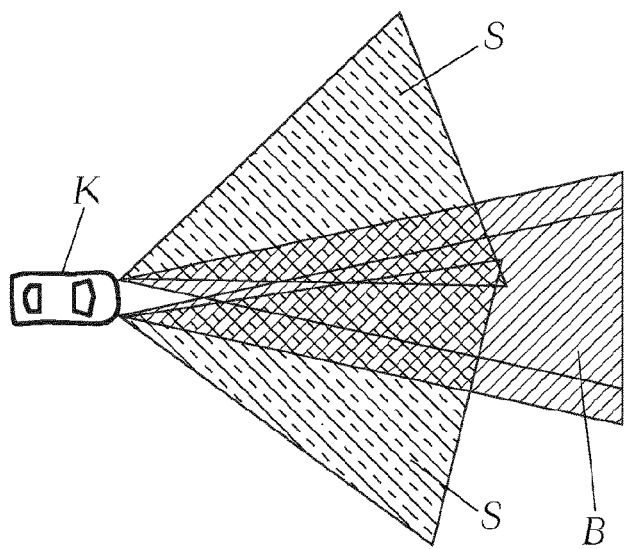
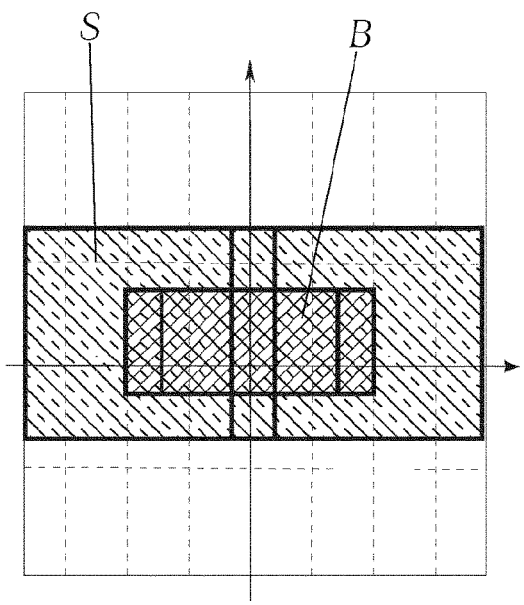
Fig. 6a　　　　　　　　Fig. 6b

LIGHT MODULE FOR MOTOR VEHICLES

The invention relates to a light module for motor vehicles.

The use of laser light sources in motor vehicles is becoming increasingly important, for reasons such as the fact that laser diodes are smaller in size compared to conventional light-emitting diodes, which enables more flexible and efficient installation solutions, and because they make it possible to significantly increase the luminance of the light beam and the light output. In the known solutions, no direct laser beam is emitted to avoid endangering the eyes of humans and other living beings due to the extremely focused, high-powered light beam. Rather, the laser beam is converted by an interconnected converter containing a luminescence-converting material, called "phosphor" for short, from, e.g., blue light to preferably "white" light.

For example, document EP 2 954 256 B1 by the applicant shows that a headlight is known which has multiple laser light sources which can be modulated and the laser beam of which is directed to a light-converting means via a pivoting micromirror controlled by a mirror control, wherein the illumination pattern generated on the same is projected onto the road by means of a projection system. To modulate the beam intensity of the laser light sources, a laser control is provided and an optics for shaping respective laser beams with a predefined beam cross-section is arranged between each laser light source and the micromirror. The micromirror oscillates about an axis at a fixed frequency, wherein the beams of the laser light sources of the first laser arrangement are deflected via the micromirror for forming adjacent light bands on the light-converting means. The distance between the light bands is determined by the mutual angle of the shaped laser beams, and the length of the light bands on the light-converting means by the oscillation amplitude of the micromirror.

In particular for assistance systems in motor vehicles, especially for autonomous or semi-autonomous operation, LIDAR (acronym for "light detection and ranging") is a favourable and reliable method for optically measuring the environment or for measuring the distance to and speed of other road users. Naturally, a large monitored angular range of the traffic space in front of the vehicle is of particular importance here. At least a part of the monitored area in question is also illuminated by the headlights of the vehicle, wherein, analogously, the LIDAR measuring an area behind the vehicle and the taillights also must be considered.

A problem of today's motor vehicles is the often-limited available installation space for lighting systems on the one hand and sensor systems on the other, wherein this problem is often exacerbated by the aesthetic specifications of designers. Another problem is that headlights as well as LIDAR systems have to be installed precisely and adjusted to ensure the desired function.

An object of the invention is reducing or eliminating these problems.

This object is solved by a light module for motor vehicles, having a first laser arrangement, which contains at least one laser light source which can be modulated, the laser beam/laser beams of which is/are directed to a pivotable micromirror controlled by a mirror control and from there to a light-converting means, and having a lighting optics for projecting the illumination pattern generated by the light-converting means into the traffic space/roadway, as a lighting system, and having a second laser arrangement which contains at least one laser light source, the laser beam/laser beams of which is/are sent to the pivotable micromirror controlled by the mirror control and from there into the traffic space/roadway via a LIDAR exit optics, as well as having a LIDAR entry optics, which sends light from the second laser arrangement reflected in the exterior space to a detector array, as a LIDAR system.

The invention makes it possible to obtain a light module which can perform two functions independently of each other in a compact design, namely a lighting function and a measuring function.

To ensure the independence of the two functions of the light module, it is advantageous if the angle of incidence of the laser beam(s) of the first laser arrangement on the micromirror is different from the angle of incidence of the laser beam(s) of the second laser arrangement. Of course, this applies to specific respective positions of the micromirror and naturally leads to different exit angles.

It is expedient if the first laser arrangement comprises at least two laser light sources, with which a laser control for modulating the beam intensity is associated.

It may also be advantageous if the first laser arrangement and the micromirror are associated with at least one optics, each for forming a laser beam with a predefined beam cross-section.

To obtain a more compact design of the module, it may be advisable that at least one deflecting mirror is arranged between the first laser arrangement and the micromirror.

If at least one deflecting mirror is arranged between the second laser arrangement and the micromirror, a more compact, space-saving design results.

In refinements of the invention, the first laser arrangement contains at least one blue/ultraviolet laser and/or the second laser arrangement contains at least one infrared laser.

To obtain the most complete reflection possible for both ultraviolet or blue laser radiation and infrared laser radiation, it is advisable that the reflective coating of the micromirror is selected from the group of metals gold, aluminium, silver.

It has proven to be effective if the micromirror oscillates about an axis at a fixed frequency, wherein the beams of the laser light sources of the first laser arrangement are deflected via the micromirror for forming at least two adjacent light bands on the light-converting means.

The distance between the light bands is expediently specified by the mutual angle of the shaped beams from the laser light sources of the first laser arrangement; the length of the light bands on the light-converting means is determined by the oscillation amplitude of the micromirror and the width of the light bands by the beam cross-section.

With regard to the compact design of the module, it is of particular advantage if the laser light sources of at least one laser arrangement and/or the mirrors located in the beam paths are adjustable for adjusting the beam paths of the lighting system and the LIDAR system.

It may also be useful if the scanning area of the LIDAR system and the illuminated area of the lighting system are positioned at an angle relative to each other, such that the LIDAR system scans diagonally to the illumination. As a result, for example, objects can be detected that are positioned outside, in particular to the side, of the illuminated area of the headlight system.

It may also be advantageous if the LIDAR system and the lighting system cover or, respectively, illuminate different fields of view via the lighting optics or, respectively, the LIDAR exit optics. It may be useful if the LIDAR exit optics are designed in such a way that the LIDAR system scans an area of the traffic space, which is wider than the illuminated area of the lighting system.

It can also be useful if diffractive optical elements are used for the optics of the LIDAR system, such as diffraction gratings.

Likewise, the optics in the laser path of the lighting system can be designed as diffractive optical elements.

Figure 2:
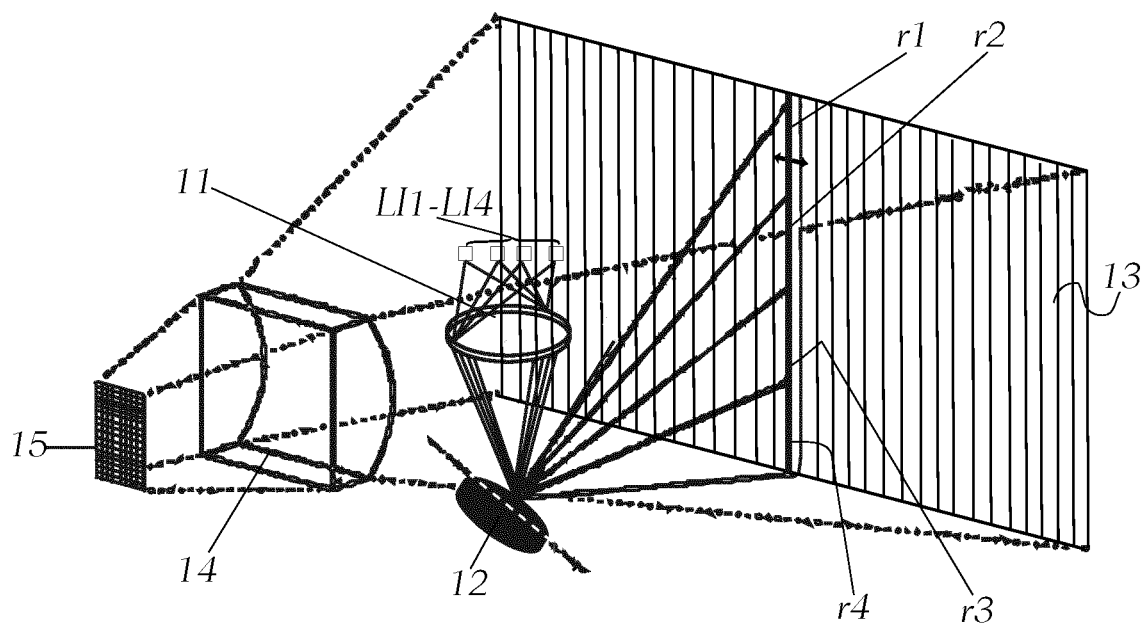
Figure 3:
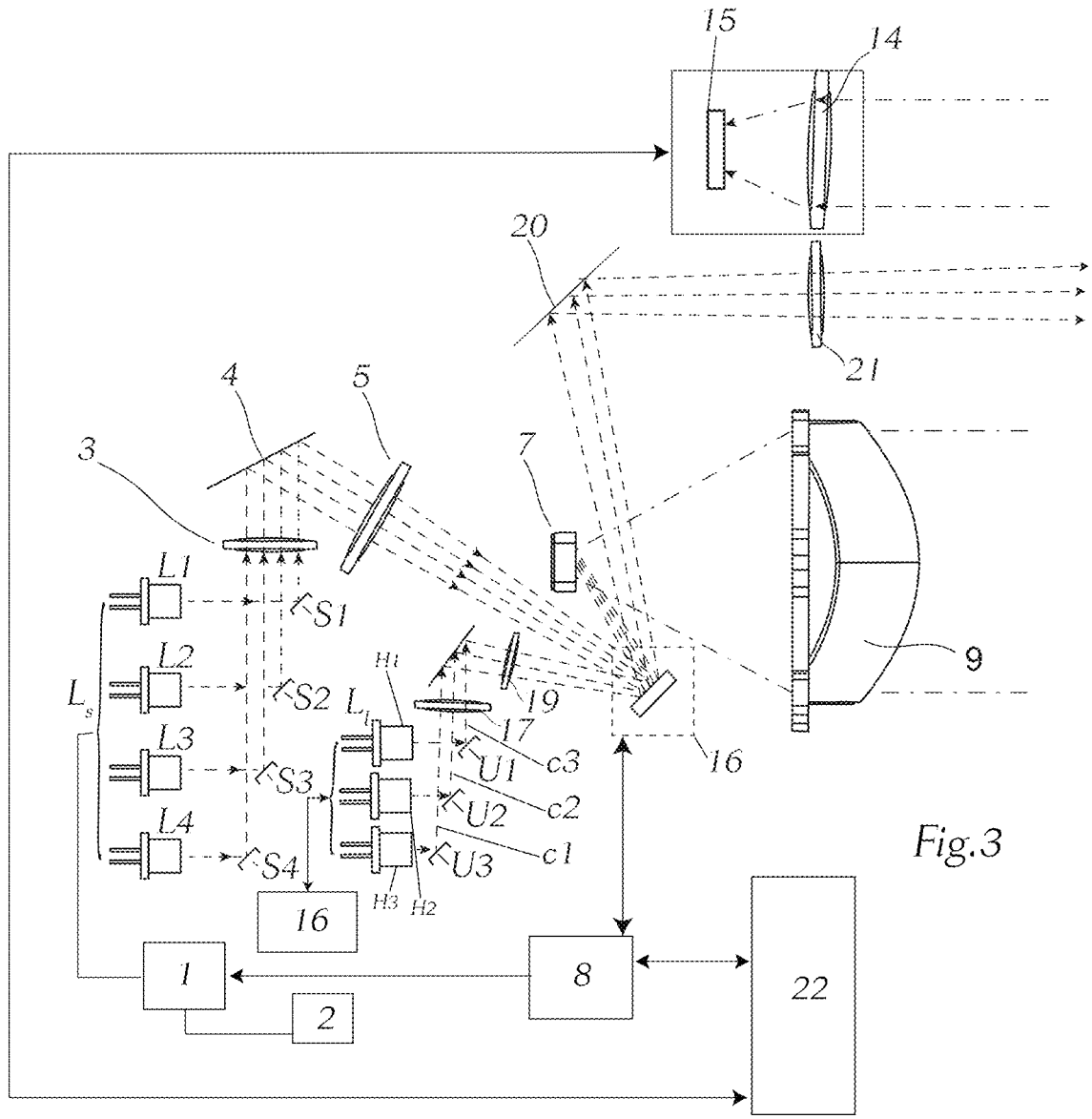
Figure 4:
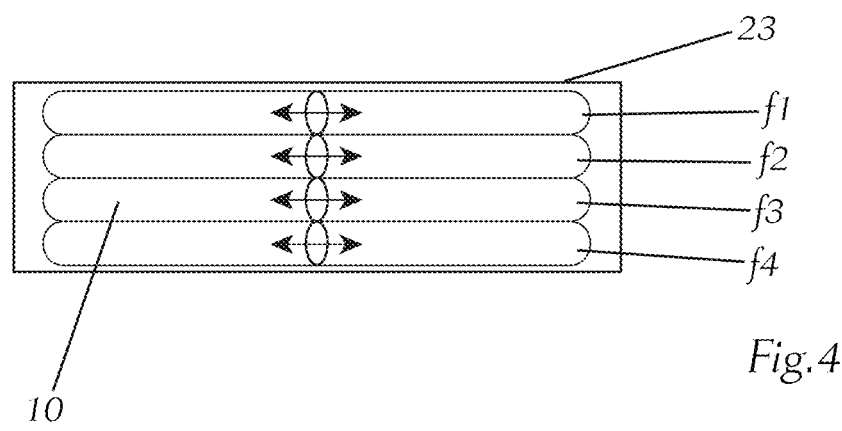

The invention and other advantages are explained in more detail below on the basis of exemplary embodiments, which are illustrated in the drawings. In these, FIG. 1 shows the basic structure of a motor vehicle headlight, which works on the basis of a laser scanner, FIG. 2 shows the principle of a scanning LIDAR system, FIG. 3 shows the basic structure of a light module according to the invention, FIG. 4 shows an example of a light distribution of a module according to the invention, FIGS. 5a and b show the area covered by both systems in a first variant and FIGS. 6a and b show the area covered by both systems in a second variant.

FIG. 1 shows the principle of a laser scanner headlight, having a first laser arrangement $L_S$, which has at least one laser, in this case four semiconductor lasers L1, L2, L3, L4, each emitting a laser beam which is referred to as b1, b2, b3, b4, respectively. The lasers L1, L2, L3, L4 are associated with a laser control 1, wherein this control serves for supplying power and is also set up for modulating the beam intensity of the individual lasers. In the context of the present invention, "modulating" is understood to mean that the intensity of a laser light source can be changed, be it continuously or pulsed, in the sense of switching the same on and off. Analogously, the light output can be dynamically changed, depending on the angular position of a mirror described in more detail later. In addition, there is the possibility of switching on and off for a specific time in order not to illuminate defined points.

The laser control 1 in turn contains signals from a central headlight control 2, which can be supplied with sensor signals. Such control and sensor signals can be, on the one hand, for example, switching commands for switching from high beam to low beam or, on the other hand, signals that are captured by light sensors which detect the lighting conditions on the road.

The laser beams b1, b2, b3, b4 are each directed to a common deflecting mirror 4 via respective deflecting mirrors S1, S2, S3, S4 and via a first optics 3, which common deflecting mirror 4 transmits the four laser beams via another optics 5 and via a micromirror 6 onto a light-converting means 7 designed, for example, as a luminous surface which, e.g., includes a phosphor for converting light in a known manner. Optics o1, o2, o3, o4 can be used downstream of lasers for shaping their beams, as explained in EP 2 954 256 B1.

For example, the phosphor converts blue or UV light into "white" light. In the context of the present invention, "phosphor" is generally understood to mean a substance or a mixture of substances which converts light of a wavelength into light of another wavelength or of multiple, blended wavelengths, in particular into "white" light, which can be subsumed under the term "wavelength conversion". "White light" is understood to mean light of such a spectral composition which causes the colour impression "white" in humans. Of course, the term "light" is not limited to radiation visible to the human eye. Opto-ceramics are also suitable for the light-converting means, which are transparent ceramics, such as YAG-Ce (an yttrium-aluminium garnet doped with cerium).

The micromirror 6, which oscillates about only a single axis, is controlled by a mirror control 8 and caused to oscillate at a constant frequency, wherein these oscillations can correspond in particular to the mechanical resonant frequency of the micromirror. The mirror control 8 in turn is controlled by the headlight control 2 to be able to adjust the oscillation amplitude of the micromirror 6, wherein the latter can also be adjusted to perform asymmetrical oscillations about its axis. The control of micromirrors is known and can be performed in many ways, e.g., in an electrostatic or electrodynamic manner. In proven embodiments of the invention, the micromirror 6 oscillates, for example, at a frequency of a few hundred Hz and its maximum deflection is between a few degrees and 60°, depending on its control. The position of the micromirror 6 is expediently reported to the mirror control 8 and/or to the headlight control 2. It should be noted that the acronym MEMS ("microelectromechanical system mirrors") is often used for micromirrors of the type in question here.

The shaped laser beams b1, b2, b3, b4 generate horizontal light bands f1, f2, f3, f4 on the light-converting means 7, namely on the luminous surface of the light-converting means 7 (see FIG. 4), which is generally flat, but does not have to be flat, wherein the angle of the laser beams b1, b2, b3, b4 or the semiconductor lasers L1, L2, L3, L4 relative to the micromirror 6 is set such that the light bands overlap and are adjacent to each other on the luminous surface, wherein the distance of the light bands from each other is preferably zero. This can be precisely adjusted by adjusting the semiconductor lasers L1, L2, L3, L4 accordingly and an illumination pattern is generated on the luminous surface, which is composed of the light bands, in this case the four light bands f1, f2, f3, f4. This illumination pattern is now projected onto the roadway or into the exterior space as an illumination pattern 10 by means of a lighting optics 9 (FIG. 4). The use of only three lasers to form three light bands projected onto the road is also possible, for example, as these light bands can then correspond to a high beam, the cut-off, and a low beam (lighting the area immediately in front of the vehicle). In the simplest case, only a single laser can be provided.

FIG. 2 shows the principle of a LIDAR system, as described, for example, in the article "MEMS-based lidar for autonomous driving", H. W. Yoo et al., e&i 6.2018, p. 408ff. The pulsed beams of multiple lasers LI1, LI2, LI3, LI4 are transmitted via an optics 11 to a micromirror 12 which horizontally scans along four vertical lines r1, r2, r3, r4 generated by the lasers LI1, LI2, LI3, LI4 in the exterior space and thus covers a specific field 13. The number of lasers and thus the vertical lines generated can be other than four, namely more or less than four, and in the simplest case a single laser can be used. Laser pulses which are reflected by objects in the exterior space (traffic space) reach a detector 15 via a focusing LIDAR entry optics 14, and the signals generated there are evaluated after appropriate amplification and conversion to be able to quickly detect objects with regard to their position and/or speed, size, etc.

FIG. 3 shows a light module according to the invention for a motor vehicle, wherein, as far as this is possible, the same reference signs are used for elements which have already been described in FIG. 1 and FIG. 2.

The structure of the section for the laser scanner headlight corresponds exactly to the one shown in FIG. 1 and has already been described in detail in connection with FIG. 1. In addition to the headlight components, namely the four semiconductor lasers L1, L2, L3, L4 with the laser control 1, the headlight control 2, the mirrors S1, S2, S3, S4, the deflecting mirror 4, the optics 5, the micromirror 6, the light-converting means 7, the mirror control 8 and the lighting optics 9, the light module now contains a second laser arrangement. LL, which has at least one laser, in this case three semiconductor lasers H1, H2, H3, each emitting a laser beam which is referred to as c1, c2, c3, respectively. Lasers H1, H2, H3 are also associated with a laser control 16. The laser beams c1, c2, c3 also reach the micromirror 6, in the present case under optical interconnection of three deflecting mirrors U1, U2, U3, an optics 17, a deflecting mirror 18 common to the three beams, as well as a further optics 19. From the micromirror 6, the scanning beams of the LIDAR system are directed into the traffic space/roadway via a deflecting mirror 20 and a LIDAR exit optics 21.

The light signals reflected by objects in the exterior space (traffic space) reach the detector 15 via the LIDAR entry optics 14, and the signals generated there are transmitted to a LIDAR control/evaluating unit 22 and are evaluated there after appropriate amplification and conversion to be able to quickly specify the detected objects with regard to their position and/or speed, size, etc. The LIDAR control/evaluating unit 22 is also connected to the mirror control 8 and—not shown in more detail here—with the control of the associated vehicle.

The representation in FIG. 3 shows that the micromirror is used jointly for both systems, namely the headlight system and the LIDAR system, but the beam paths of both systems extend separately, i.e., the beams of the LIDAR system do not strike the light-converting means 7 and the beams of the headlight system do not reach the LIDAR exit optics.

To ensure the independence of the two functions of the light module, it is advantageous if the angle of incidence of the laser beam(s) of the first laser arrangement on the micromirror is different from the angle of incidence of the laser beam(s) of the second laser arrangement. Of course, this applies to specific respective positions of the micromirror and naturally leads to different exit angles. In other words, the IR beams of the LIDAR system are reflected at a different angle than the blue or ultraviolet laser beams of the lighting system and both beam groups exit the module, wherein in any case a different exit optics is used for the LIDAR system than is used for the lighting. The lasers are modulated accordingly to determine the distance of an object in the traffic space on the basis of ToF methods or FMCW methods (Time of Flight (ToF), Frequency Modulated Continuous Wave LIDAR) by means of the signals emitted by the detector. The infrared beams and the blue laser beams are always reflected from the same mirror position, but the beam path is geometrically separated, which is why the module can work simultaneously in LIDAR and in illumination mode.

The entire control of the systems, in particular the mirror control 8 is designed in such a manner that both systems function independently of each other and can work simultaneously or alternately. To ensure this and with regard to the compact design of the module, it is of particular advantage if the laser light sources of at least one laser arrangement and/or the mirrors located in the beam paths are adjustable for adjusting the beam paths of the lighting system and the LIDAR system.

While the semiconductor lasers L1, L2, L3, L4 preferably should work with wavelengths in the blue or UV range to generate white light by conversion on the phosphor, the semiconductor lasers H1, H2, H3 of the LIDAR system preferably work with wavelengths in the IR range to produce radiation invisible to the human eye. Of course, it must be considered that a micromirror 6 which has sufficient reflection properties for both light wavelengths used is required in the present case. In this sense, coatings made primarily of gold or aluminium, or silver are particularly suitable. A complete reflection of the laser radiation striking the micromirror reduces the problem of excessive heat generation on the MEMS.

FIG. 4 schematically represents a light distribution of the light module according to the invention, wherein four light bands f1, f2, f3, f4 with "white" light, which originate in the first laser arrangement $L_S$, are positioned on top of each other and form the illumination pattern 10. The light bands are created by the scanning movement of the illuminated spots m1, m2, m3, m4 resulting from the laser beams. The area scanned by the LIDAR system is depicted here by its boundary 23.

The LIDAR system and the lighting system can cover or, respectively, illuminate a different field of view, which is possible due to the separate optics, namely the lighting optics 9 and the LIDAR exit optics 21. For the lighting system, the term "field of view" here is to be understood to describe the illuminated area in the traffic space, which can be of different sizes depending on the current lighting situation (e.g., high beam-low beam-daylight), and for the LIDAR system, the area scanned by the LIDAR laser beams, in which objects can be detected.

As a result, the imaging ranges of LIDAR and lighting may be different, although the same MEMS scanner, namely micromirror 6, is used for both systems. For example, the LIDAR exit optics 21 may be designed in such a manner that the LIDAR system scans an area of the traffic space, which is wider than the illuminated area of the lighting system. It may also be useful if the scanning area of the LIDAR system and the illuminated area of the lighting system are positioned at an angle relative to each other, such that the LIDAR system scans diagonally to the illumination.

For illustrative purposes, a first example of an illuminated area B of the lighting system and a scanning area S of the LIDAR system of a motor vehicle K with two light modules according to the invention are shown in FIGS. 5a and b. FIG. 5a shows the areas in a view from above and FIG. 5b shows the areas in front of the vehicle, as seen from the vehicle. Here, the illuminated area B comprises a smaller angle than does the scanning area S, but both areas are facing forward.

FIGS. 6a and b, in a representation analogous to FIGS. 5a and b, show a second example of an illuminated area B and a scanning area S of a motor vehicle K having two light modules according to the invention. Here, the illuminated area B, as in FIGS. 5a and b, extends forward at a certain angle in the direction of travel, whereas the scanning area S of the LIDAR system, divided into two parts, so to speak, also extends far to the outside left and outside right.

It is clearly shown that the LIDAR can cover a wider area than the lighting optics, and can also be pivoted to the side, wherein the viewing areas of the LIDARs of a left and a right headlight just overlap. However, the lighting optics must always be aligned straight forward.

Diffractive optical elements, for example diffraction gratings, can be used as optics 14, 17, 19, 21 for the LIDAR system, as laser radiation with low spectral bandwidth, preferably monochromatic laser radiation, is used here. The optics o1-o4, 3, 5 in the blue laser path of the lighting system can also be designed as diffractive elements. However, the projection optics in the beam path of the "white" light downstream of the light-converting means 7 should be a lens optics, as colour errors are to be avoided here.

LIST OF REFERENCE SIGNS

| | |
|---|---|
| 1 | Laser control |
| 2 | Headlight control |
| 3 | Optics |
| 4 | Deflecting mirror |
| 5 | Optics |
| 6 | Micromirror |
| 7 | Light-converting means |
| 8 | Mirror control |
| 9 | Lighting optics |
| 10 | Illumination pattern |
| 11 | Optics |
| 12 | Micromirror |
| 13 | Field |
| 14 | LIDAR entry optics |
| 15 | Detector |
| 16 | Laser control |
| 17 | Optics |
| 18 | Deflecting mirror |
| 19 | Optics |
| 20 | Deflecting mirror |
| 21 | LIDAR exit optics |
| 22 | LIDAR control/evaluation unit |
| 23 | Boundary |
| B | Illuminated area |
| b1 | Laser beam |
| b2 | Laser beam |
| b3 | Laser beam |
| b4 | Laser beam |
| c1 | Laser beam |
| c2 | Laser beam |
| c3 | Laser beam |
| f1 | Light band |
| f2 | Light band |
| f3 | Light band |
| H1 | Semiconductor laser |
| H2 | Semiconductor laser |
| H3 | Semiconductor laser |
| K | Motor vehicle |
| $L_I$ | Second laser arrangement |
| $L_S$ | First laser arrangement |
| L1 | Semiconductor lasers |
| L2 | Semiconductor lasers |
| L3 | Semiconductor lasers |
| L4 | Semiconductor lasers |
| LI1 | Laser |
| LI2 | Laser |
| LI3 | Laser |
| LI4 | Laser |
| m1 | Illuminated spot |
| m2 | Illuminated spot |
| m3 | Illuminated spot |
| m4 | Illuminated spot |
| o1 | Optics |
| o2 | Optics |
| o3 | Optics |
| o4 | Optics |
| r1 | Vertical line |
| r2 | Vertical line |
| r3 | Vertical line |
| r4 | Vertical line |
| S | Scanning area |
| S1 | Deflecting mirror |
| S2 | Deflecting mirror |
| S3 | Deflecting mirror |
| S4 | Deflecting mirror |
| U1 | Deflecting mirror |
| U2 | Deflecting mirror |
| U3 | Deflecting mirror |

The invention claimed is:

1. A light module for motor vehicles, the light module comprising:
a first laser arrangement ($L_S$), which contains at least one laser light source (L1, L2, L3, L4) which can be modulated, the laser beam/laser beams (b1, b2, b3, b4) of which is/are directed to a pivotable micromirror (6) controlled by a mirror control (8) and from there to a light-converting means (7);
a lighting optics (9) for projecting an illumination pattern generated by the light-converting means (10) into a traffic space/roadway, as a lighting system; and
a second laser arrangement ($V_L$), which contains at least one laser light source (H1, H2, H3), wherein its laser beam(s) (c1, c2, c3) is/are sent to the pivotable micromirror (6) controlled by the mirror control (8) and from there, via a LIDAR exit optics (21) separate from the lighting optics (9), into the traffic space/roadway, as well as having a LIDAR entry optics (14), which sends light of the second laser arrangement reflected in the exterior space to a detector (15), as a LIDAR system, wherein the angle of incidence of the laser beam(s) (b1, b2, b3, b4) of the first laser arrangement ($L_S$) on the micromirror (6) is different from the angle of incidence of the laser beam(s) (c1, c2, c3) of the second laser arrangement ($V_L$), wherein a scanning area, defined as the area scanned by LIDAR laser beams of the LIDAR system, and an illuminated area, defined as the area of the traffic space/roadway illuminated by the lighting optics of the lighting system, are positioned at an angle to each other, such that the LIDAR system scans diagonally to the illumination, wherein the LIDAR system and the lighting system cover or illuminate different fields of view via the lighting optics (9) or, respectively, the LIDAR exit optics (21), wherein the LIDAR exit optics (21) is designed in such a manner that the LIDAR system scans an area of the traffic space which is wider than the illuminated area of the lighting system.

2. The light module according to claim 1, wherein the first laser arrangement ($L_S$) comprises at least two laser light sources (1a, 1b, 1c, 1d), which are associated with a laser control (1) for modulating the beam intensity.

3. The light module according to claim 1, wherein at least one optics (o1, o2, o3, o4) is arranged between the first laser arrangement ($L_S$) and the micromirror (6) for shaping respective laser beams (b1, b2, b3, b4) with predefined beam cross-sections.

4. The light module according to claim 1, wherein at least one deflecting mirror (4, S1-S4) is arranged between the first laser arrangement ($L_S$) and the micromirror (6).

5. The light module according to claim 1, wherein at least one deflecting mirror (18, U1-U4) is arranged between the second laser arrangement ($V_L$) and the micromirror (6).

6. The light module according to claim 1, wherein the first laser arrangement contains at least one blue/ultraviolet laser.

7. The light module according to claim 1, wherein the second laser arrangement contains at least one infrared laser.

8. The light module according to claim 1, wherein the reflective coating of the micromirror (6) is selected from the group of the metals gold, aluminium, and silver.

9. The light module according to claim 1, wherein the micromirror (6) oscillates about an axis at a fixed frequency, wherein the beams of the laser light sources of the first laser arrangement ($L_S$) are deflected via the micromirror for forming at least two adjacent light bands (f1, f2, f3, f4) on the light-converting means (7).

10. The light module according to claim 1, wherein the distance between the light bands (f1, f2, f3, f4) is specified by the mutual angle of the shaped beams of the laser light sources of the first laser arrangement ($L_S$), the length of the light bands at the light-converting means (7) is determined by the oscillation amplitude of the micromirror (6) and the width of the light bands is determined by the beam cross-section.

11. The light module according to claim 1, wherein the laser light sources (L1, L2, L3, L4; H1, H2, H3) of at least one laser arrangement ($L_S$, $V_L$) and/or the mirrors (4, S1-S4, 18, U1-U3) positioned in the beam paths are adjustable for aligning the beam paths of the lighting system and the LIDAR system.

12. The light module according to claim 1, wherein diffractive optical elements, such as diffraction grating, are used for the optics (14, 17, 19, 21) of the LIDAR system.

13. The light module according to claim 1, wherein the optics (o1-o4, 3, 5) in the laser path of the lighting system are designed as diffractive optical elements.

14. The light module according to claim 12, wherein the diffractive optical elements comprise diffraction grating.

* * * * *